United States Patent

Steggewentz

[15] 3,665,139

[45] May 23, 1972

[54] DEVICE FOR EPITACTIC PRECIPITATION OF SEMICONDUCTOR MATERIAL

[72] Inventor: Hermann Steggewentz, Munich, Germany

[73] Assignee: Siemens Aktingesellschaft, Berlin and Munich, Germany

[22] Filed: May 12, 1970

[21] Appl. No.: 36,599

[30] Foreign Application Priority Data

May 16, 1969 Germany ...................... P 19 24 997.9

[52] U.S. Cl. ............................. 219/10.43, 13/26, 13/DIG. 1
[51] Int. Cl. ....................................................... H05b 9/00
[58] Field of Search .................. 13/1, 26, DIG. 1; 219/10.43, 219/405, 390

[56] References Cited

UNITED STATES PATENTS

| | | |
|---|---|---|
| 2,478,001 | 8/1949 | Miskella ............................... 219/405 |
| 2,676,233 | 4/1954 | Foxx .................................... 219/10.79 |
| 2,800,519 | 7/1957 | Garmy .................................... 13/132 |
| 2,826,666 | 3/1958 | Cater ...................................... 13/132 |
| 3,124,633 | 3/1964 | Van Ron ................................. 13/132 |

Primary Examiner—J. V. Truhe
Assistant Examiner—Hugh D. Jaeger
Attorney—Curt M. Avery, Arthur E. Wilfond, Herbert L. Lerner and Daniel J. Tick

[57] ABSTRACT

A device for epitactic precipitation of semi-conductor material on substrate bodies within a reactive vessel. The substrate bodies are normally heated through an induction coil outside the vessel. According to the invention a mirrored layer is placed at least around a portion of the wall of the reaction vessel. The mirrored layer reflects heat radiation from the substrate bodies back thereto.

9 Claims, 1 Drawing Figure

Patented May 23, 1972 3,665,139
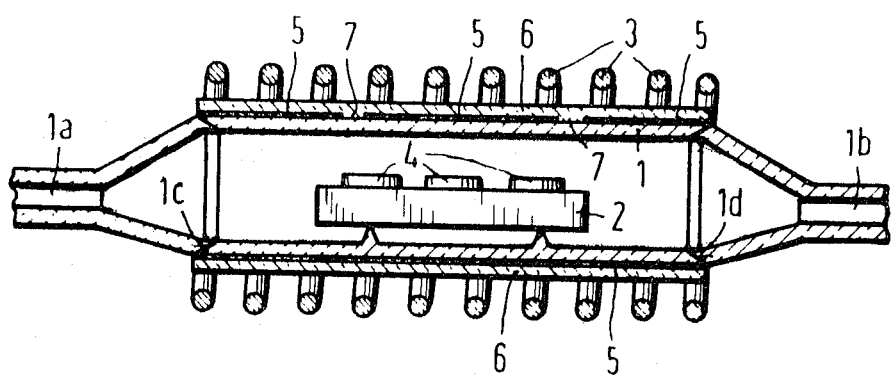

DEVICE FOR EPITACTIC PRECIPITATION OF SEMICONDUCTOR MATERIAL

My invention relates to a device for epitactic precipitation of semiconductor material on substrate bodies particularly of insulating material within a reaction vessel preferably of pure quartz. The substrate bodies are heated through the field of an induction coil enclosing the reaction vessel from the outside, to a high temperature, required for precipitating the semiconductor material from the reaction gas which is in contact with the substrate bodies.

Such devices are generally known. The substrate bodies are often wafer shaped and positioned on a base of a material that is thermally and chemically stable as well as electricity-conducting. The substrates are heated in the field of the induction coil, to the required high temperature. The, usually cylindrical, reaction container is enclosed, at the height of the base, in a tight coupling relation by the induction coil so that the induction heating, preferably a high frequency heating, may be effected with a good degree of effectiveness. The reaction vessel primarily comprising pure quartz then insures a high degree of purity for the material precipitating from the gaseous phase, by observing known measures, which serve primarily for purification purposes. The properties of the reaction gas as well as details of the precipitation process, are known per se.

In such processes, the substrate wafers, which consist, e.g., of silicon or silicon carbide, are heated to very high temperatures, for example to 1,400° C. The following goals are aimed at, in this connection:

1. Reduction of the heating output fed into the induction coil, this is of the output to be delivered by the high frequency generator,
2. Production of a uniform temperature by heat radiation reflected on all sides and issuing from the heated substrate,
3. An effective cooling of the reactor walls.

I achieve these goals by a reflecting lining of at least one part of the wall of the reaction container, so that the reflected radiation is thrown back upon the substrate bodies, or upon a base of conducting material, which heats said substrate bodies through heat contact.

The drawing illustrates the device.

The invention will now be described in greater detail with reference to the drawing. The reaction container of material, which does not conduct electricity and preferably is of pure quartz, is provided with an electricity conducting heating body 2, for example, silicized graphite, that is a graphite body coated with silicon. Body 2 carries at its surface, the substrate wafers 4, for example of monocrystalline silicon, to be epitactically coated. The cylindrical reaction vessel 1 is so enclosed by an induction coil 3. The heating body 2 is located within the high frequency field, produced by this coil 3. The high frequency generator required for operating said coil is not shown; its output is such that the substrate wafers 4 are heated through the effect of the heater body 2, to the high temperature, required for epitactic precipitation.

The invention provides reflective linings 5 at the wall of the cylindrical reaction container 1. These linings cause the radiation which is emitted by the heater 2, or by the substrate wafers 4, to be reflected back and be largely absorbed by the substrate wafers and heater, so that the loss of radiation is considerably reduced. This also, to a large extent, compensates for variable temperature distribution at the heater and at the wafers, through irregular radiation loss or irregular heating. The reflecting coating is preferably applied at the outside of the reaction vessel 1 and, if necessary, protected by an insulating layer 6, e.g., a quartz or glass layer. The lining consists preferably of silver or another highly reflective material and is so thin, that a predominently large part of the high frequency output of the coil 3 may pass this lining.

The supplied high frequency output may be made smaller and its frequency may be increased, so that the depth of penetration into the heater, i.e., the thickness of its housing, may be reduced by a possibly hollow heater 2 which also affords, for example, a reduction of the contamination danger, caused by foreign bodies which evaporate from the heater. In many instances, it may be preferred to cool the wall of the reaction container 1, which may be effected, for example, by a double-wall embodiment in which a coolant circulates between both walls and which absorbs, as little as possible, the high frequency field.

An inlet 1a and an outlet 1b are provided in the example for supplying the reaction container with fresh reaction gas. The individual parts are fitted gas-tightly into one another, with the aid of ground sections 1c, 1d. A hollow embodiment of the heat 2, or an embodiment where an insulating highly heat-resistant core is provided with a thin-walled, conductive layer also saves energy. It is sufficient to make the layer so thin that it will constitute an equivalent of the current concentration at the surface of the heater 2, resulting from the high frequencies (skin effect).

The layer 5 which reflects have radiation but is transparent to high frequency, is considerably thinner than the corresponding width of the skin. It is also possible to influence beneficially, the locally varying loss of radiation of the heater 2, and thus a temperature distribution at its surface, through an appropriate distribution of the reflecting layer 5 and by its design.

It may also be advantageous, for example for cleaning the reactor with sharp cleaning means, that the relatively sensitive reflection and protective layers 5,6 of the reaction container 1, are also separable. If, for example, the reactor has a prismatic or cylindrical configuration, than the layers 5 and 6, may be provided on a second, removable cylindrical housing which surrounds the reaction vessel 1. Such a housing may be dismountable, especially for complicated shapes of the reaction vessel 1, or be designed as a system comprising a plurality of mirrors, in order to reinforce the desired temperature distribution at the surface of the heater.

EXAMPLE

The cylindrical reaction vessel has an inside diameter of 15 cm and comprises highly pure quartz. The outside wall is provided with a reflecting silver layer of about 0.1 to 10 microns thickness. The heater is of appropriately pure graphite or carbon and has a housing thickness of about 1 to 5 mm. The heater, as well as the metallization 5, may be coated for its protection, with an appropriately stable inorganic material. Observation windows 7 may be left exposed in the reflecting coating 5, 6 as shown in the drawing.

I claim:

1. A device for epitactic precipitation of semiconductor material on substrate bodies within a reaction vessel of insulating material, said semiconductor bodies being heatable by the field of an induction coil surrounding the reaction vessel whereby the semiconductor material precipitates on the reaction bodies, a reflective lining between the wall of a cylindrical reaction vessel made of quartz or glass, the thickness of the reflective layer is less than the skin thickness for passing high frequency current necessary for heating, but sufficient for reflecting back the radiation to the substrate bodies or to a heater with which the substrate bodies are in contact.

2. The apparatus of claim 1 wherein the heat reflective lining is of silver.

3. The apparatus of claim 1 wherein the reaction vessel at least at the location of the lining is made of double walls with means for passing cooling means through the space between the walls.

4. The apparatus of claim 3 wherein the thickness of the reflective silver layer is from 0.1 to 10 microns.

5. The apparatus of claim 1 wherein a heater is provided for heating the substrate bodies, only the surface layer of the heater is of conductive material and the strength of the heater is greater than the skin thickness of the high frequency current used.

6. The apparatus of claim 5 wherein the heater is hollow whereby it may be filled with a material of low thermal conductivity.

7. The apparatus of claim 5 wherein the heater is hollow whereby it may be filled with air.

8. The apparatus of claim 5 wherein the heater is hollow whereby it may be evacuated.

9. The apparatus of claim 1 wherein the reflective coating in the wall of the reaction vessel contains observation windows.

* * * * *